US008530785B2

(12) United States Patent
Peng

(10) Patent No.: US 8,530,785 B2
(45) Date of Patent: Sep. 10, 2013

(54) METHOD FOR LASER-MARKING AND AN ARTICLE MARKED BY SUCH METHOD

(75) Inventor: Qinyun Peng, Yorktown Heights, NY (US)

(73) Assignee: Merck Patent GmbH, Darmstadt (DE)

(*) Notice: Subject to any disclaimer, the term of this patent is extended or adjusted under 35 U.S.C. 154(b) by 2703 days.

(21) Appl. No.: 11/194,591

(22) Filed: Aug. 2, 2005

(65) Prior Publication Data

US 2007/0029294 A1 Feb. 8, 2007

(51) Int. Cl.
*B23K 26/00* (2006.01)
*B23K 26/36* (2006.01)
*B23K 26/40* (2006.01)

(52) U.S. Cl.
CPC ........... *B23K 26/365* (2013.01); *B23K 26/4075* (2013.01); *B23K 26/4065* (2013.01)
USPC ....... 219/121.69; 428/402; 428/403; 428/407

(58) Field of Classification Search
USPC .................. 219/121.12, 121.4, 121.6, 121.68
See application file for complete search history.

(56) References Cited

U.S. PATENT DOCUMENTS

| 5,643,318 | A | * | 7/1997 | Tsukernik et al. | 606/214 |
|---|---|---|---|---|---|
| 7,169,471 | B1 | * | 1/2007 | Dreher et al. | 428/402 |
| 2003/0153983 | A1 | * | 8/2003 | Miller et al. | 623/23.7 |
| 2006/0155007 | A1 | * | 7/2006 | Huber | 523/205 |

* cited by examiner

*Primary Examiner* — Tu B Hoang
*Assistant Examiner* — Thien S Tran
(74) *Attorney, Agent, or Firm* — Millen, White, Zelano & Branigan, P.C.

(57) ABSTRACT

The present invention generally relates to a method of laser-marking. The method can include exposing a precursor to a laser creating a mark. The precursor can include a polymer or plastic loaded with a laser-marking additive in an amount of or greater than about 1 wt. %. The additive can include:
    at least one compound of the formula:

$MOCl$ where M is, independently, As, Sb, or Bi; or
a compound of the formula $BiONO_3$, $Bi_2O_2CO_3$, $BiOOH$, $BiOF$, $BiOBr$, $Bi_2O_3$, $BiOC_3H_5O_7$, $Bi(C_7H_5O_2)_3$, $BiPO_4$, $Bi_2(SO_4)_3$, $Pb(OH)_2 \cdot 2PbCO_3$, or $Pb(OH)_2 \cdot PbCO_3$.

20 Claims, 4 Drawing Sheets

METHOD FOR LASER-MARKING AND AN ARTICLE MARKED BY SUCH METHOD

Laser beam irradiation can initiate a chemical change producing a permanent visible mark on a substrate. These substrates can include an organic resin or a matrix, such as a thermoset or thermoplastic article, a coating on a substrate, or a fibrous sheet such as paper or cardboard. Such marks are used to create lettering, numbering, codes such as bar codes, and designs. Generally, laser-marks provide a higher degree of permanence and durability compared to printed ink marks, such as screen printed or laser jet marks applied directly onto the surface of the substrate or by, for example, adhesive labels, to an article. A laser-mark can provide irreversible chemical changes incorporated or encapsulated directly into a substrate, unlike a printed mark that can fail due to chemical or physical degradation of adhesive or the binder components.

Laser-marked articles can be used in many of the same fields, such as electrical, electronic or medical device industries, as printed articles. As an example, the labeling and inscription of, for example, cables, wires, trend strips, or functional parts in the heating, ventilation and cooling sectors of switches, plugs, levers or handles, are even possible at poorly accessible points with the aid of a laser. What is more, nontoxic laser-marked articles can be safely employed in packaging for foodstuffs or toys. These markings on packaging can be wipe- and scratch-resistant, stable during subsequent sterilization processes, and applied in a hygienically pure manner during the marking process. Complete label motifs can be applied durably to the packaging for a reusable system. Furthermore, laser-marking can be used for plastic tags, such as cattle tags or ear-mark tags. Combined with a bar code system, the information specific to the animal can be stored and recalled with the aid of a scanner. Durability of the mark on the tag is very important because the tag can remain on the animal for several years.

The laser-marking for articles can take two forms. The first form involves the forming of localized encapsulated foams during exposure to a laser, which lighten a colored or dark resin. A second form exposes to a laser light a localized area that may induce formation of a carbonaceous char residue that converts the localized area to a much darker or virtually black color compared to the unexposed surrounding regions.

Resin without additives, or filled or pigmented substrates often are not intrinsically very sensitive to laser beam exposure. Consequently, marking these materials may require prolonged exposure and/or high energy density. These requirements make the process more expensive and less commercially attractive. Furthermore, although a high energy exposure may create a mark with sufficient contrast, often the definition of the mark becomes distorted or irregular rendering the mark commercially less effective or even completely useless. To enhance the laser-marking process, often an agent is incorporated within the substrate to produce a well-defined mark under less aggressive exposure conditions that are commercially practical for automation and high throughput.

Plastics useful for radiopaque medical devices, such as catheters, have incorporated a radiopaque filler, such as a bismuth compound or barium sulfate. These devices are inserted into the body and due to the radiopaque additives, are contrasted with surrounding tissue when viewed by a fluoroscope or X-ray.

However, it is generally desirable to add a laser-marking additive to a medical device if laser-marking is desired. In such an instance, the additive has to be safe for use in medical devices. Therefore, it would be desirable to provide a method for permanently marking an article with an additive of proven safety useful, e.g., as a medical device as well as providing articles made by such a permanent marking method.

The present invention relates to a method of laser-marking. The method can include exposing a precursor to a laser creating a mark or a step for laser-marking a precursor, which can include exposing a precursor to a laser. Generally, the precursor includes a polymer or a plastic. Desirably the plastic is an elastomer, a thermosetting plastic, or a thermoplastic. The precursor can also be a thermoplastic or thermoset substrate. Generally, the polymer or plastic is loaded with a laser-marking additive that is also radiopaque under a fluoroscope or x-ray imaging in an amount of or greater than about 1 wt. %. The additive can include at least one compound of the formula:

MOCl where M is, independently, As, Sb, or Bi; or
a compound of the formula $BiONO_3$, $Bi_2O_2CO_3$, BiOOH, BiOF, BiOBr, $Bi_2O_3$, $BiOC_3H_5O_7$, $Bi(C_7H_5O_2)_3$, $BiPO_4$, $Bi_2(SO_4)_3$, $Pb(OH)_2 \cdot 2PbCO_3$, or $Pb(OH)_2 \cdot PbCO_3$. Desirable, the additive includes BiOCl. Furthermore, the plurality of particles can have a thickness less than about 1 micron and all dimensions less than about 35 microns.

The present invention may further relate to a method of laser-marking. The method can include exposing a precursor to a laser creating a mark. Generally, the precursor includes a polymer or plastic loaded with a laser-marking additive that is also radiopaque under a fluoroscope or x-ray imaging in an amount of greater than about 5 wt. %, or even about 10 wt. %, wherein the additive may include:

at least one compound of the formula:

MOCl where M is, independently, As, Sb, or Bi; or
a compound of the formula $BiONO_3$, $Bi_2O_2CO_3$, BiOOH, BiOF, BiOBr, $Bi_2O_3$, $BiOC_3H_5O_7$, $Bi(C_7H_5O_2)_3$, $BiPO_4$, $Bi_2(SO_4)_3$, $Pb(OH)_2 \cdot 2PbCO_3$, or $Pb(OH)_2 \cdot PbCO_3$.

The present invention can further still relate to a method of laser-marking including exposing a precursor to a laser creating a mark. Generally, the precursor includes a polymer or plastic loaded with a laser-marking additive in an amount of greater than about 5 wt. %, or even about 10 wt. %, wherein the additive includes BiOCl.

Generally, the precursor is a polyolefin, a polyamide, a polyester, a polyester ester, a polyether ester, a polyphenylene ether, a polyacetal, a polybutylene terephthalate, a thermoplastic polyurethane, a polymethyl methacrylate, a polyvinyl acetal, a polystyrene, an acrylonitrile-butadiene-styrene, polytetrafluoroethylene, an acrylonitrile-styrene-acrylate, a polycarbonate, a polyether sulphone, a polyether ketone, a copolymer thereof, or a mixture thereof. Desirably, the precursor is polyurethane, polyamide, or polyethylene.

What is more, the polymer or plastic can be loaded with at least about 1 weight percent of the additive up to the limit that the mechanical properties of the substrate are not unsuitable for an intended use. Generally, the polymer or plastic is loaded with greater than about 1-about 70 weight percent, or greater than about 1-about 50 weight percent of the additive. Desirably, the polymer or plastic is loaded with about 10-about 50, or about 10-about 40 weight percent of the additive. Optimally, the polymer or plastic is loaded with about 15-about 30 weight percent of the additive. The weight percent of the additive loaded is based on the total weight of the polymer or plastic plus additives.

Generally, the laser is a pulsed laser, a gas laser, or an excimer laser. Desirably, the laser is a Nd:YAG laser.

The present invention can also relate to a method of making an article. The method can include shaping a laser-marked article as described above into a predetermined form, such as a medical device, desirably a catheter, or an implant. Alternatively, the present invention includes laser-marking a precursor already fashioned into a predetermined form, e.g. catheter tubing.

The present invention can further relate to a laser-marked article made by one of the methods described above.

As used herein, the term "mechanical stability" means that the substrate loaded with a filler has not had its mechanical properties changed to such an extent to make it unsuitable for a particular purpose.

Figure 1:
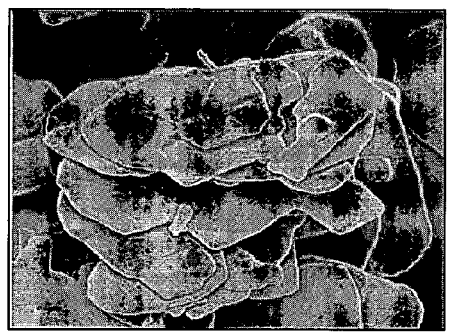
FIG. 1 is an SEM picture of exemplary bismuth oxychloride particles sold under the trade designation BIRON® LF-2000.

Generally, the laser-marking additive includes non-platelet particles having all dimensions less than about 5 microns, preferably all particle dimensions less than about 1 micron, or platelet particles generally having a thickness (vertical dimension) less than about 1 micron and all dimensions less than about 35 microns, and preferably, a thickness of about 200-about 700 nm, and a diameter (lateral dimension) of about 5-about 35 microns.

Desirably, the laser-marking additive, as described above, includes bismuth due to its non-toxicity. With respect to the laser-marking additive of bismuth, a preferred laser-marking additive of bismuth can also include $BiONO_3$, $Bi_2O_2CO_3$, $BiOCl$, $BiOOH$, $BiOF$, $BiOBr$, $Bi_2O_3$, $BiOC_3H_5O_7$, $Bi(C_7H_5O_2)_3$, $BiPO_4$, and $Bi_2(SO_4)_3$ and most preferably $BiOCl$. Alternatively, a laser-marking additive can include lead carbonate of the formula $Pb(OH)_2 \cdot 2PbCO_3$ or $Pb(OH)_2 \cdot PbCO_3$.

Bismuth oxychloride powder can have a thickness ranging from about 50 nm-about 1 μm. The individual particle can have any shape: square, round, octahedral, or irregular. Generally, bismuth oxychloride powder crystals are highly agglomerated. Bismuth oxychloride powders are particularly preferred, especially non-high luster bismuth oxychloride powders, although high luster bismuth oxychloride powders can also be used. Non-high luster bismuth oxychloride when well dispersed in a smooth and uniform lacquer film has a luster index of less than 50%. Luster index is defined as:

$$\text{Luster index} = 100\% * (L_{22.5°/22.5° \text{ over black}} - L_{45°/0° \text{ over black}})/L_{22.5°/22.5° \text{ over black}}$$

with the angles given as incident/observed using a Hunter L, a, b system, with a colorimeter sold under the trade designation HUNTER D25 M-9 colorimeter by Hunter Associates of Reston, Va.

Particularly preferred non-high luster bismuth oxychloride powders are sold under the trade designation BIRON® Fines, BIRON® B50, BIRON® ESQ, BIRON® LF-2000, BIRON® MTU, or a mixture thereof by EMD Chemicals, Inc. of Hawthorne, N.Y. and MERCK KGaA of Darmstadt, Germany. Properties of these bismuth oxychloride powders are depicted in the following table:

TABLE 1

BIRON® POWDER PRODUCTS

| PRODUCTS | PARTICLE SIZE (D50) | RELATIVE TRANSPARENCY | BULK DENSITY (g/in³) | LIGHT STABILITY |
|---|---|---|---|---|
| BIRON® Fines | 2-35 μm (9-15 μm) | less transparent | 3-7 | fair |
| BIRON® B-50 | 2-35 μm (9-15 μm) | less transparent | 6-10 | fair |

TABLE 1-continued

BIRON ® POWDER PRODUCTS

| PRODUCTS | PARTICLE SIZE (D50) | RELATIVE TRANSPARENCY | BULK DENSITY (g/in³) | LIGHT STABILITY |
|---|---|---|---|---|
| BIRON ® ESQ | 2-35 µm (9-15 µm) | slightly more transparent | 6-12 | good |
| BIRON ® LF-2000 | <35 µm (8-20 µm) | more transparent | 8-12 | very good |
| BIRON ® MTU | 2-35 µm (12-18 µm) | more transparent | 13-18 | very good |

Other powders useful in the invention are sold under the trade designations BIRON® NLD and MIBIRON® N-50 by EMD Chemicals, Inc. of Hawthorne, N.Y. and MERCK KGaA of Darmstadt, Germany.

Figure 2:
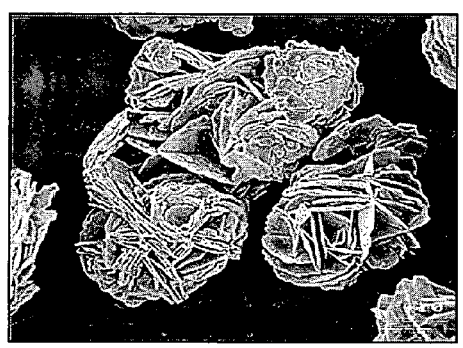
FIG. 2 is a SEM picture of other exemplary bismuth oxychloride particles sold under the trade designation BIRON® ESQ.

As depicted in FIGS. 1 and 2, Biron® LF-2000 and Biron® ESQ contain irregular platelet-shaped crystals and their agglomerates. Moreover, these powders are commercially available with different transparency, bulk density, and light stability. Bismuth oxychloride powders have a density of 7.7 g/cm³, a color of white, a stability up to 600° C., good dispersibility, and good lubricity. All of these bismuth oxychloride powders have a very low moisture content (less than 0.5 wt. %). Because of their crystalline (non-porous) nature and the smooth surface of the crystal platelets, the oil absorption of these powders is relatively low, in the range of 15-60 grams/100 grams. Generally, these particles have the following features:

TABLE 2

BIRON ® Powder Product Range

| BIRON ® B-50 | relatively transparent and lustrous |
| BIRON ® Fines | relatively transparent and lustrous, slightly less heavy |
| BIRON ® LF-2000 | light stable, less transparent and lustrous |
| BIRON ® MTU | light stable, very transparent and matte |
| BIRON ® ESQ | transparent and matte |
| BIRON ® NLD | relatively transparent and lustrous, contains wetting agent for better dispersibility |
| MIBIRON ® N-50 | 50% bismuth oxychloride on mica for lower cost |

Figure 18:
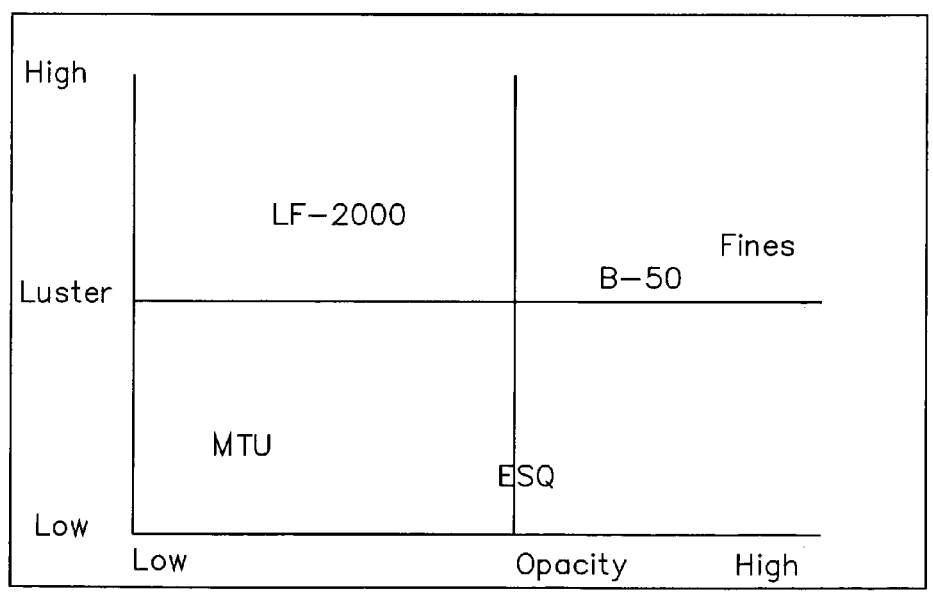
FIG. 18 is a graphical comparison of relative luster and transparency of several commercially available BIRON® powders.
Figure 3:
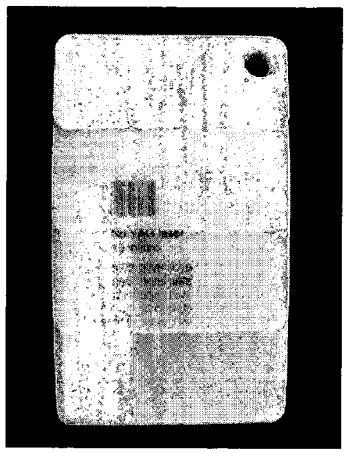
FIG. 3 is a picture of an exemplary laser-marked embodiment of the present invention of a high-density polyethylene loaded with 1% by weight bismuth oxychloride.
Figure 4:
FIG. 4 is a picture of an exemplary laser-marked embodiment of the present invention of a high-density polyethylene loaded with 5% by weight bismuth oxychloride.
Figure 5:
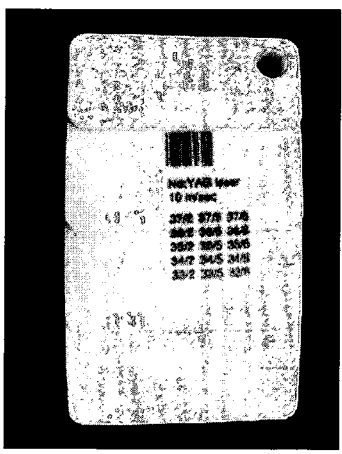
FIG. 5 is a picture of an exemplary laser-marked embodiment of the present invention of a high-density polyethylene loaded with 10% by weight bismuth oxychloride.
Figure 6:
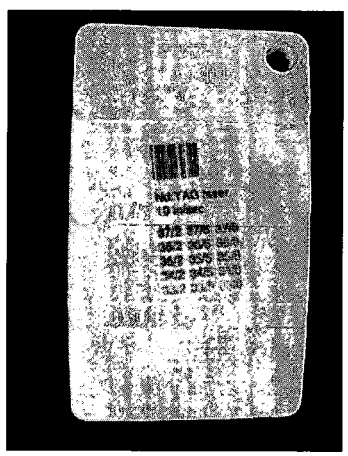
FIG. 6 is a picture of an exemplary laser-marked embodiment of the present invention of a high-density polyethylene loaded with 15% by weight bismuth oxychloride.
Figure 7:
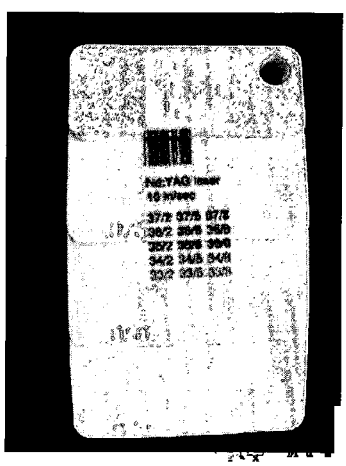
FIG. 7 is a picture of an exemplary laser-marked embodiment of the present invention of a high-density polyethylene loaded with 20% by weight bismuth oxychloride.
Figure 8:
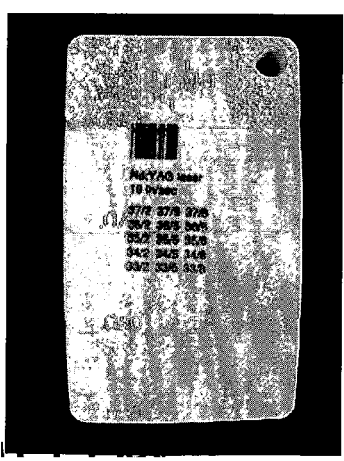
FIG. 8 is a picture of an exemplary laser-marked embodiment of the present invention of a high-density polyethylene loaded with 25% by weight bismuth oxychloride.

A comparison of luster and opacity of the first five of these powders is depicted in FIG. 18.

For $BiONO_3$, $Bi_2O_2CO_3$, $BiOOH$, $BiOF$, $BiOBr$, $Bi_2O_3$, $BiOC_3H_5O_7$, $Bi(C_7H_5O_2)_3$, $BiPO_4$, and $Bi_2(SO_4)_3$ particles, the dimensions of the particles generally are less than about 10 micron. In some cases platelet particles can be formed in a manner similar to BiOCl.

Although not wanting to bound by any particular theory, BiOCl crystals can be obtained by the following reaction:

$$Bi^{3+}+H_2O+Cl^- \rightarrow BiOCl+2H^+.$$

An additive of the present invention can be a composite including a laser-marking additive along with an organic compound, as discussed in further detail below. Desirably, the laser-marking additive is intimately commingled with the organic compound. The organic compound can be a fatty amine and/or amide, a cationic surfactant, an anionic surfactant, a nonionic surfactant, a silane, a siloxane, or a polymer. Suitable organic compounds are disclosed in DE 43 052 80 A1. Particularly, the organic additive, as partly discussed above, may include an ethoxylated fatty amine or amide, an ethoxylated fatty alkyl quaternary amine salt, an ethoxylated di-fatty alkyl quaternary amine, ethoxylated quaternary fatty salt, a sodium stearate, an ethoxylated sorbitol ester of a fatty acid, a fatty alcohol quaternary amine, a non-ethoxylated quaternary chloride salt, a mineral oil, a fatty ethoxylated aminopropylamine, an alkanolamide, a fatty trialkyl quaternary salt, a difatty dialkyl quaternary salt, a fatty amine, a fatty amine oxide, a fatty betaine, a fatty amidopropyl betaine, a fatty amphoteric, an N-fatty amino acid, and/or a fatty imidazoline. In addition, the organic compound or additive can be at least one anionic and/or nonionic fatty surfactant, such as a fatty ethoxylated carboxylate, a fatty carboxylate, a fatty carboxylic acid, a fatty ethoxylated phosphate, a di-fatty ethoxylated phosphate, a fatty ethoxylated sulfonate, a fatty ethoxylated sulfate, a fatty aryl sulfonate, a fatty ethoxylated carboxylate, a difatty carboxylate ethoxylate, a fatty glycol ester, and/or a fatty ethoxylated alcohol.

Generally the organic compound is present in the composite in an amount of less than 2%, by weight with respect to the weight of the composite. Also, other substances may be present. As an example, bismuth oxychloride powder can be 98% pure, with the remainder being a residual salt of an alkali nitrate, such as sodium nitrate, potassium nitrate or ammonium nitrate; an alkali chloride such as sodium chloride, potassium chloride, or ammonium chloride; one or more surfactants, such as an ethoxylated fatty amine or amide as discussed above; and/or one or more resins.

With respect to laser-marking additives, particularly those of bismuth such as bismuth oxychloride, these additives can be prepared without a carrier (neat) or with a carrier. Such carriers can include organic fluids or solids. Suitable carriers for thermoplastics can be organic solids or fluids of generally high melting point, highly non-polar and hydrophobic. Such carriers can include mineral oil/petrolatum; vegetable oils such as fatty acids, e.g., castor oil; paraffin waxes; polyolefin waxes; low molecular weight polymers and co-polymers including block co-polymers; polyethylene glycol and polypropylene glycol waxes; plasticizers, including esters, in turn including fatty acid esters, organophosphates, phthalates, citrates, and trimellitates; fatty acid salts; and fatty alcohols. Carriers compatible with thermosetting plastics useful in the present invention can be alkyd, polyester, or acrylic resins; mineral oil/petrolatum; vegetable oils such as fatty acids, e.g., castor oil; paraffin waxes; polyolefin waxes; low molecular weight polymers and co-polymers including block co-polymers; polyethylene glycol and polypropylene glycol waxes; plasticizers, including esters, in turn including fatty acid esters, organophosphates, phthalates, citrates, and trimellitates; fatty acid salts; fatty alcohols; and organic solvents of low to medium polarity including chlorinated hydrocarbons, glycol ethers, alcohols, ethers, esters, ketones, aromatics, mineral spirits including aromatic and aliphatic types.

Generally, the bismuth laser-marking additive, such as bismuth oxychloride, in the carrier can range from 15-98% by weight of the dispersion or dry preparation.

The manufacture of laser-marking additives, such as BiOCl, includes the precipitation of bismuth oxychloride particles and/or intimate commingling of organic additives, by cavitational homogenization of a dispersion of a laser-marking additive, e.g. in equipment such as rotor/stator mixer, a Gaulin homogenizer, or a homogenizer sold under the trade designation MICROFLUIDICS homogenizer by Microfluidics of Newton, Mass.

In addition, the additives of the present invention can be combined with a wide variety of colorants, fillers, functional additives, e.g. dispersing agents, or conductive powders, or other additives that would provide comparable or superior sensitivity to laser-marking as compared to, for example, bismuth oxychloride alone. These other additives can include inorganic or organic materials, either as neat or composite particles.

The additive of the present invention can be incorporated into all sorts of polymers, or plastics, such as elastomers, or thermoplastic or thermoset materials, in the form of, e.g., substrates. Examples of suitable precursors are a polyolefin, a polyamide, a polyester, a polyester ester, a polyether ester, a polyphenylene ether, a polyacetal, a polybutylene terephthalate, a thermoplastic polyurethane, a polymethyl methacrylate, a polyvinyl acetal, a polystyrene, an acrylonitrile-butadiene-styrene, an acrylonitrile-styrene-acrylate, a polytetrafluoroethylene, a polycarbonate, a polyether sulphone, a polyether ketone, a copolymer thereof, or a mixture thereof. Particularly suitable are thermoplastic polyurethanes (TPUs) owing to their good mechanical properties and inexpensive processing methods. Thermoplastic polyurethanes have long been known from numerous patents and other publications, for example from GB 1,057,018 and EP 0 564,931. Also, polyamides are desirable, as well as polyethylene or polypropylene. Suitable types of polyethylene include LDPE, LLDPE, ULDPE, VLDPE, HDPE, and UHMWPE, with a density of 0.955 g/cc and a 7.9 melt index.

Generally, the laser-marking additive, such as bismuth oxychloride, is dry mixed at room temperature with a suitable resin, such as polyethylene, before loading into the film or plastic. The laser-marking additive can be combined with a resin, and dry mixed with a load shear mixer in order to maintain temperatures below the softening point of the resin. Generally, the mixing time is kept short to avoid heat build up from friction but sufficient to obtain a uniform distribution of the resin and laser-marking additive to avoid major stratification or pockets.

If desired, an adhesive, an organic polymer-compatible solvent, a stabilizer and/or a surfactant can be added to the mix. As an example, a plastic granular and/or pigment mixture can be introduced into a suitable mixer, wetted with any additives, and then mixed with the added bismuth oxychloride. Also, the pigmentation can be carried out via a color concentrate or a compound. The resultant mixture can then be processed directly in an extruder, and optionally subsequently fed to an injection-molding machine. Generally for testing purposes, the mixture can be fed directly into an injection-molding machine.

The mixing equipment and technique is generally dependent on the batch size and sheer required for compounding. Also, the speed and time requirements for mixing are dependent on the other materials, such as pigments and other additives, in the dry batch.

After mixing, the resultant mix can be extruded or molded at an elevated temperature. Generally, extrusion is undertaken at ambient atmospheric pressure and a temperature of 150-250° C., depending on the base substrate or resin. The extrusion rate is dependent upon the screw size (diameter and length) of the extruder as well as the extruder's rpm and power. The extrusion rate is also dependent upon the materials being extruded. Any suitable type of extruder, such as single screw, or twin screw can be used to achieve the desired throughput. After extrusion, the material is cooled for a set period of time, and then, is ready for laser-marking.

Once the precursor is formed by mixing and extruding, the precursor can be molded and subsequently exposed to laser radiation to create a laser-marked article. Generally, in a finished article, the loading of a bismuth oxychloride powder ranges from about 1% by weight up to about 60%, preferably about or greater than about 1%-about 50%, or preferably still about 10-about 40%, by weight. The basis of the loading weight percent is the additive divided by the sum of the polymer or plastic, additive, and any other ingredients. Generally, higher loading yields a darker mark.

A polyurethane polymer with a hardness of Shore 84A is filled with 25 weight percent BIRON® B-50 and fashioned into a catheter tubing with a thickness of 0.023 inch (0.058 cm).

Laser-marking is carried out by introducing the precursor into the beam path of any suitable laser. Generally, the laser can be a pulsed laser, a gas laser, or an excimer laser. An exemplary pulsed laser is a neodymium (3+)-doped yttrium aluminum garnet (Nd:YAG) laser either at 1064 nm or 532 nm wavelength at doubled frequency. One exemplary gas laser is a $CO_2$ laser, preferably having a 10,600 nm wavelength, and one exemplary excimer laser is a krypton fluoride laser having a 250 nm wavelength. A gas laser or an excimer laser can be used in conjunction with a mask technique. The output of a laser depends on the particular application and can be determined by an individual skilled in the art.

One optimal laser, the Nd:YAG laser, can be a diode-pumped solid-state laser. Its wavelength range is fixed to a narrow bandwidth by virtue of the discrete narrow distribution of energy states in the excited and ground state. Generally, the wavelength can be precisely as 1064 nm, but the frequency can be doubled to 532 nm by use of a non-linear optical crystal. A Nd:YAG laser is sold under the trade designation LUMONICS LASERWRITER SPC from Gsi Lumonics of Farmington Hills, Mich. Generally, these lasers range from 33-37 amps in 1-amp steps and 2,000-8,000 pulses per second in two steps of 3,000 with a linear speed of 10 inches per second (25.4 cm/second). Preferably, the laser-marking occurs with a combination of 2,000 pulses per second and 33 amps at 25.4 cm/second. Generally, the markings are carried out at ambient atmospheric pressure and temperature. However, atmospheres other than air, such as oxygen, nitrogen, or a noble gas can be used.

The resultant laser-marked material can be fashioned into an article of a predetermined dimension. Such articles include medical devices. Alternatively, the laser-markable precursor can be fashioned into a article of a predetermined dimension and subsequently laser-marked. With respect to medical devices, desirable devices include catheters, implants, trocars and tubings.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and, all parts and percentages are by weight, unless otherwise indicated.

The entire disclosure of all applications, patents and publications, cited herein is hereby incorporated by reference.

EXAMPLES

Example 1

Five powders sold under the trade designation BIRON®, commercially available from EMD Chemicals, Inc. and their parent company MERCK KGaA are loaded into HDPE with a wax but no other additives, fillers, or colorant. The loading is in weight percent. The molded plastic chips are directly compounded by mixing additive powders with resin powders and injection molding without first forming an extruded concentrate. The subsequent molded chips (stepped plate chips) are exposed to a laser under identical conditions. The laser is a laser sold under the trade designation LUMONICS LASERWRITER SPC, a Nd:YAG laser employing a grid of two-fold combinations of decreasing power (current is controlled) ranging from 33-37 amps in 1-amp steps and increasing pulse frequencies ranging from 2,000-8,000 pulses per second in two steps of 3,000, with a linear speed of 10 inches (25.4 cm) per second. The marks are in all cases dark, as opposed to white. The laser-marked chips with BIRON® powders are compared to the one without BIRON® powder.

TABLE 3

| PIGMENT | TYPE | LOADING | Mark Contrast/Sensitivity vs. NEAT RESIN |
|---|---|---|---|
| BIRON ® B50-173 | powder | 1% | better/stronger |
| BIRON ® B50 | powder | 1% | better/stronger |
| BIRON ® LF 2000 | powder | 1% | better/stronger |
| BIRON ® MTU | powder | 1% | better/stronger |
| BIRON ® Fines | powder | 1% | better/stronger |

Example 2

Various samples of powder are prepared by treating a neat non-high luster bismuth oxychloride powder sold under the trade designation of BIRON FINES by EMD Chemicals, Inc. of Hawthorne, N.Y. and MERCK KGaA, Darmstadt, Germany, by suspending the powder in hot deionized water and adding an organic additive at 1% by weight of a base powder. The treated powder is then filtered without washing and drying in an oven followed by sieving. The following organic compounds or additives are employed:

TABLE 4

| Example 2a | [α] | ethoxylated fatty amine |
| Example 2b | [β] | ethoxylated fatty alkyl quaternary amine |
| Example 2c | [χ] | ethoxylated di-fatty alkyl quaternary amine |
| Example 2d | [δ] | sodium stearate |
| Biron NLD | [ε] | ethoxylated sorbitol ester of fatty acid |
| Bentone 27V | [φ] | fatty alkyl quaternary amine. |

A non-high luster, non-neat bismuth oxychloride, sold under the trade designation BIRON NLD available from EMD Chemicals, Inc. and their parent company MERCK KGaA, is a bismuth oxychloride powder treated with 1-2% of organic additive. Another powder that contains no bismuth oxychloride and is sold under the trade designation BENTONE 27V by Elementis Specialties, Inc. of Hightstown, N.J., and is composed of treated hectorite clay intimately commingled with an organic additive. All samples are tested under substantially identical conditions. The molded plastic chips are directly compounded by mixing additive powders with HDPE resin powder and submitting the resultant mixture to injection molding without first forming an extruded concentrate. Loading is in weight percent in HDPE without any other additives, fillers or colorants. The laser exposures are performed using a laser sold under the trade designation LUMONICS LASERWRITER SPC, a Nd:YAG laser employing a grid of two-fold combinations of decreasing power (current is controlled) ranging from 33-37 amps in one-amp steps and an increasing pulse frequencies ranging from 2,000-8,000 pulses per second in two steps of 3,000, with a linear speed of 10 inches (25.4 cm) per second. The marks observed in all cases are dark, as opposed to white.

TABLE 5

| PIGMENT | TYPE OF ORGANIC ADDITIVE | LOADING | MARK CONTRAST/SENSITIVITY vs. NEAT RESIN |
|---|---|---|---|
| Biron Fines | none | 1% | better/stronger |
| Example 2a | [α] | 1% | better/stronger |
| Example 2b | [β] | 1% | better/stronger |
| Example 2c | [χ] | 1% | better/stronger |
| Example 2d | [δ] | 1% | better/stronger |
| BIRON NLD | [ε] | 1% | better/stronger |
| BENTONE 27V | [φ] | 1% | comparable/comparable |

| PIGMENT | ADDITIVE | LOADING | MARK CONTRAST/SENSITIVITY vs. BIRON ® FINES AT 1% |
|---|---|---|---|
| BIRON FINES | none | 1% | —/— |
| Example 2a | [α] | 1% | very slightly better/very slightly stronger |
| Example 2b | [β] | 1% | comparable/comparable |
| Example 2c | [χ] | 1% | very slightly poorer/very slightly weaker |
| Example 2d | [δ] | 1% | slightly poorer/slightly weaker |
| BIRON NLD | [ε] | 1% | very slightly poorer/very slightly weaker |
| BENTONE 27V | [φ] | 1% | much poorer/much weaker |

The above data in Table 5 demonstrates that retroactive treatment of powder bismuth oxychloride with a variety of different organic additives, i.e. adding the organic additive after the formation of the BiOCl, provides only a weak influence with respect to laser-marking sensitivity and contrast. It appears that ethoxylated fatty amine only provides a slight enhancement compared to untreated bismuth oxychloride powder. In the case of the samples treated with sodium stearate and BIRON NLD, the different treatments have been independently demonstrated to result in better dispersion by virtue of an enhanced pearlescent effect. Therefore the above tests appear to demonstrate that better dispersion by itself is insufficient to render enhanced laser-marking sensitivity from bismuth oxychloride. Furthermore, the much poorer sensitivity of laser-marking rendered by hectorite clay treated with a fatty alkyl quaternary amine demonstrates that a powder containing a non-bismuth oxychloride substrate intimately commingled with organic additives does not achieve the same laser-marking contrast/sensitivity as a BIRON® Fines bismuth oxychloride.

Example 3

Four samples are prepared with a neat non-high luster bismuth oxychloride powder having a luster index <50% sold under the trade designation BIRON® ESQ and manufactured by EMD Chemicals, Inc. of Hawthorne, N.Y. The four samples are treated by a combination of sheer mixing with or without treatment of an ethoxylated fatty amine surfactant. The ethoxylated fatty amine surfactant is of the formula R1N(R2)2 where: R1 is an alkyl of 8-22 C atoms, and R2 is, independently, 1-25 units of —CH2CH2O— where the last unit terminates in a hydrogen atom. Water suspensions of approximately 50% non-high luster bismuth oxychloride are submitted to high sheer mixing using rotor/stator impeller heads, supplied by Kady International, a Kinetic Dispersion Company of Scarborough, Me. After mixing for either 3 or 12 minutes in attempt to ensure nearly complete comminution without inducing agglomeration, the suspension is optionally mixed with a fatty amine ethoxylate surfactant at a ratio of 1% per weight of bismuth oxychloride. Microscopic examination indicates that the original particles are extremely comminuted and dispersed. Four samples are spray-dried, and extruded with polyethylene at a loading of 0.5% by weight of the total weight into an injection-molder. These four samples are depicted below:

TABLE 6

| COMMINUTION DURATION | ADDITIVE 1% ETHOXYLATED FATTY AMINE | MARKING CONTRAST/SENSITIVITY vs. POLYETHYLENE CONTAINING NO ADDITIVES |
|---|---|---|
| 3 minutes | none | better/stronger |
| 12 minutes | none | better/stronger |
| 3 minutes | Added after grinding | better/stronger |
| 12 minutes | Added after grinding | better/stronger |

Compared to polyethylene containing no additives, the laser-marking performance of these samples in sensitivity and contrast/definition is better. As exemplified, the laser-marking sensitivity of a powder-type bismuth oxychloride is not increased by comminution (i.e., fragmentation in the lateral aspect).

Example 4

Nylon elastomer and polyurethane tubes, with or without bismuth oxychloride additives, are exposed to a Nd:YAG laser as described in Example 1 to determine their suitability for laser-marking. The nylon elastomer with a hardness of Shore 63D is sold under the trade designation PEBAX by the Arkema Group of Paris la Défense Cedex, France, and the polyurethane with Shore 84A is used as discussed above. The precursors can be made according to a method described above.

The laser-marking results are depicted in the following table:

TABLE 7

CATHETER LASER-MARK STUDY

Figure 11:
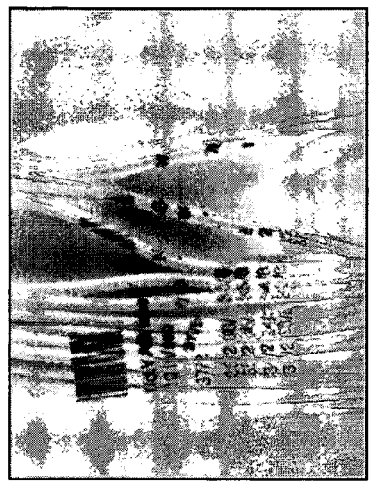
FIG. 11 is a picture of an exemplary laser-marked embodiment of the present invention of polyurethane loaded with 25% by weight BIRON® MTU bismuth oxychloride additive.
Figure 14:
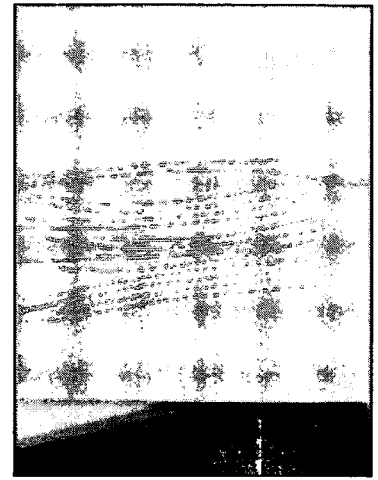
FIG. 14 is a picture of a comparative nylon elastomer sample loaded with no additives after exposure to a laser.
Figure 10:
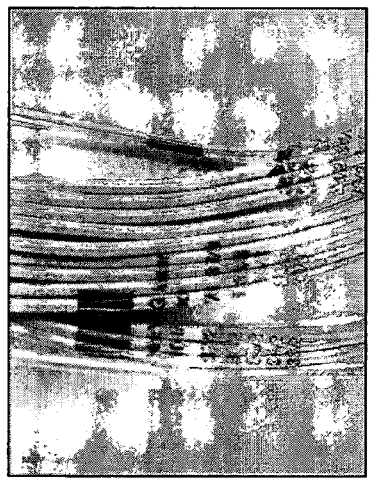
FIG. 10 is a picture of an exemplary laser-marked embodiment of the present invention of polyurethane loaded with 25% by weight BIRON® B50-173 bismuth oxychloride additive.
Figure 13:
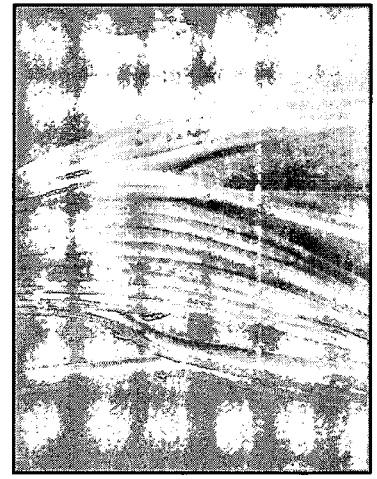
FIG. 13 is a picture of a comparative sample of polyurethane loaded with barium sulfate and titanium dioxide.
Figure 9:
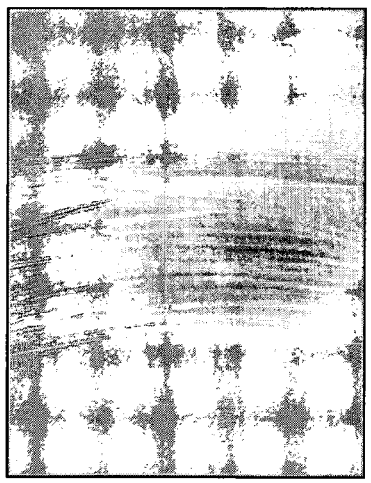
FIG. 9 is a picture of a comparative polyurethane sample loaded with no additives after exposure to a laser.
Figure 12:
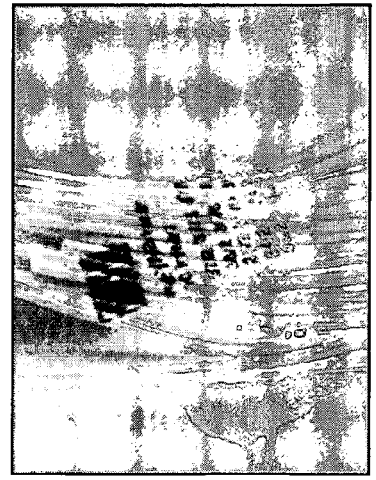
FIG. 12 is a picture of an exemplary laser-marked embodiment of the present invention of polyurethane loaded with 25% by weight BIRON® LF-2000 bismuth oxychloride additive.
Figure 17:
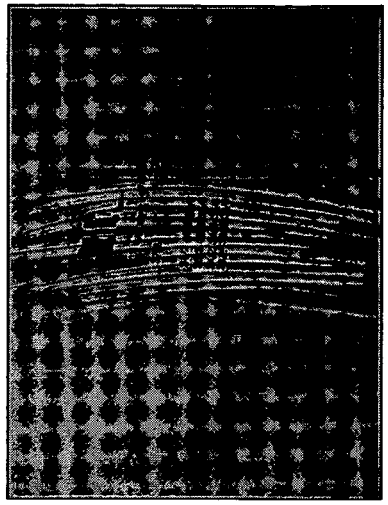
FIG. 17 is a picture of an exemplary laser-marked embodiment of the present invention of a nylon elastomer loaded with 25% by weight BIRON® LF-2000 bismuth oxychloride additive.
Figure 16:
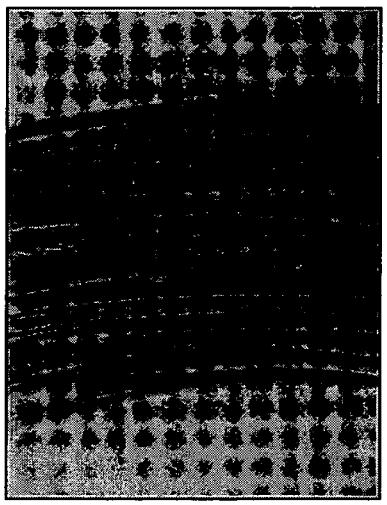
FIG. 16 is a picture of an exemplary laser-marked embodiment of the present invention of a nylon elastomer loaded with 25% by weight BIRON® MTU bismuth oxychloride additive.
Figure 15:
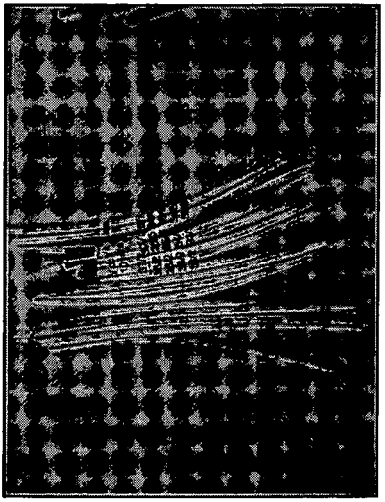
FIG. 15 is a picture of an exemplary laser-marked embodiment of the present invention of a nylon elastomer loaded with 25% by weight of BIRON® B-50-173 bismuth oxychloride additive.

| SAMPLE NUMBER | POLYMER TYPE | ADDITIVE OR BiOCl TYPE | WT. % | LASERMARK RESOLUTION | LASERMARK CONTRAST | DEPICTED IN FIG. |
|---|---|---|---|---|---|---|
| PA-1 | nylon elastomer | None | 0 | none | none | FIG. 14 |
| PA-2 | nylon elastomer | BIRON ® B-50-173 | 25 | excellent | excellent | FIG. 15 |
| PA-3 | nylon elastomer | BIRON ® MTU | 25 | excellent | excellent | FIG. 16 |
| PA-4 | nylon elastomer | BIRON ® LF-2000 | 25 | good | excellent | FIG. 17 |
| PU-1 | polyurethane | none | 0 | none | none | FIG. 9 |
| PU-2 | polyurethane | BIRON ® B-50-173 | 25 | excellent | excellent | FIG. 10 |
| PU-3 | polyurethane | BIRON ® MTU | 25 | excellent | excellent | FIG. 11 |
| PU-4 | polyurethane | BIRON ® LF-2000 | 25 | good | excellent | FIG. 12 |
| PU-5 | polyurethane | barium sulfate titanium dioxide | 25 2 | None | None | FIG. 13 |

Catheters PU-2-PU-4 clearly exhibit superior marking capability as compared to the polyurethane without an additive (PU-1 as depicted in FIG. 9) and a polyurethane loaded with 25 wt. % of $BaSO_4/TiO_2$ (PU-5). Also, catheters PA-2-PA-4 clearly exhibit superior marking capability as compared to the nylon elastomer without an additive (PA-1 as depicted in FIG. 14).

Example 5

Six samples include high-density polyethylene, a polyethylene wax sold under the nation LICOWAX PE520 by Clariant corporation of Charlotte, N.C., and BIRON® bismuth oxychloride powder. Particularly, the amounts (in grams) of each of these are depicted in the samples:

TABLE 8

| SAMPLE | HDPE (g) | LICOWAX PE wax (g) | LT-2000 BiOCl (g) |
|---|---|---|---|
| 1 | 490 | 5 | 5 |
| 2 | 470 | 5 | 25 |
| 3 | 445 | 5 | 50 |
| 4 | 420 | 5 | 75 |
| 5 | 395 | 5 | 100 |
| 6 | 370 | 5 | 125 |

The ingredients for each sample are bag-shaken and extruded in a one-inch (2.5 cm) single screw lab extruder with a 24:1 length:diameter ratio sold by Wayne Machine & Die Company of Totowa, N.J. The extruder is operated at 60 rpm with the following temperature profile:

TABLE 9

| REGION | TEMPERATURE ° F. (° C.) |
| --- | --- |
| ZONE 1 | 410 (210) |
| ZONE 2 | 420 (216) |
| ZONE 3 | 440 (227) |
| DIE ZONE 1 | 420 (216) |
| DIE ZONE 2 | 410 (210) |

Subsequently, the extruded samples are processed in a dipronic injection molder sold under the trade designation BOY 225 by Boy Machines, Inc. of Exton, Pa., which is operated with the following temperature profile:

TABLE 10

| REGION | TEMPERATURE ° F. (° C.) |
| --- | --- |
| Barrel Rear | 390 (199) |
| Barrel Middle | 440 (227) |
| Barrel Nozzle | 420 (216) |
| Mold | 90 (32) |

Afterwards, the samples are exposed to a Nd:YAG laser as described in Example 1. As depicted in FIGS. 3-8, samples containing higher weight percent of bismuth oxychloride, particularly samples having 10-25 wt. % bismuth oxychloride, create a more visible mark.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A method of laser-marking comprising exposing a precursor,
wherein the precursor comprises a polymer or plastic loaded with a laser-marking additive in an amount of greater than about 1 wt. %,
wherein the additive comprises at least one compound of the following formula:

MOCl where M is, independently, As, Sb, or Bi; or
a compound of the formula $BiONO_3$, $Bi_2O_2CO_3$, BiOOH, BiOF, BiOBr, $Bi_2O_3$, $BiOC_3H_5O_7$, $Bi(C_7H_5O_2)_3$, $BiPO_4$, $Bi_2(SO_4)_3$, $Pb(OH)_2 \cdot 2PbCO_3$, or $Pb(OH)_2 \cdot PbCO_3$;
to a laser creating a mark
wherein a lacquer drawdown comprising the additive has a luster index of less than 50%, and wherein the additive has a loading weight of 10 to 40% by weight.

2. A method according to claim 1, wherein the polymer or plastic is a polyolefin, a polyamide, a polyester, a polyester ester, a polyether ester, a polyphenylene ether, a polyacetal, a polybutylene terephthalate, a thermoplastic polyurethane, a polymethyl methacrylate, a polyvinyl acetal, a polystyrene, a polytetrafluoroethylene, an acrylonitrile-butadiene-styrene, an acrylonitrile-styrene-acrylate, a polycarbonate, a polyether sulphone, a polyether ketone, a copolymer thereof, or a mixture thereof.

3. A method according to claim 1, wherein the additive comprises BiOCl.

4. A method according to claim 1, wherein the additive includes a plurality of particles, which have a thickness less than about 1 micron and are in all dimensions less than about 35 microns.

5. A method according to claim 1, wherein the polymer or plastic is a polyurethane, polyamide, or polyethylene.

6. A method according to claim 1, wherein the polymer or plastic is loaded with about 15-about 30 weight percent of the additive.

7. A method according to claim 1, wherein the laser is a pulsed laser, a gas laser, or an excimer laser.

8. A method according to claim 1, wherein the laser is a Nd:YAG laser.

9. A method of making an article, comprising shaping a laser-marked precursor according to claim 1 into a predetermined form.

10. A method according to claim 9, wherein the article is a medical device.

11. A method according to claim 9, wherein the article is a catheter.

12. A method of marking an article, comprising shaping the precursor into a predetermined form before laser-marking according to the method of claim 1.

13. A laser-marked article made by the method according to claim 1.

14. A method of laser-marking comprising laser-marking a precursor, wherein the precursor comprises:
a polymer or plastic loaded with a laser-marking additive in an amount of greater than 1 wt. %, wherein the additive comprises:
at least one compound of the formula:

MOCl where M is, independently, As, Sb, or Bi; or
a compound of the formula $BiONO_3$, $Bi_2O_2CO_3$, BiOOH, BiOF, BiOBr, $Bi_2O_3$, $BiOC_3H_5O_7$, $Bi(C_7H_5O_2)_3$, $BiPO_4$, $Bi_2(SO_4)_3$, $Pb(OH)_2 \cdot 2PbCO_3$, or $Pb(OH)_2 \cdot PbCO_3$,
wherein a lacquer drawdown comprising the additive has a luster index of less than 50%, and wherein the additive has a loading weight of 10 to 40% by weight.

15. A method according to claim 14, wherein laser-marking the precursor comprises exposing a precursor to a laser.

16. A method according to claim 1, wherein the precursor comprises an elastomer, a thermoplastic or a thermosetting plastic.

17. A method according to claim 14, wherein the precursor comprises an elastomer, a thermoplastic or a thermosetting plastic.

18. A method of laser-marking comprising
exposing a precursor,
wherein the precursor comprises a polymer or plastic loaded with a laser-marking additive in an amount of greater than about 1 wt. %,
wherein the additive comprises at least one compound of the following formula:

MOCl where M is, independently, As, Sb, or Bi; or
a compound of formula $BiONO_3$, $Bi_2O_2CO_3$, BiOOH, BiOF, BiOBr, $Bi_2O_3$, $BiOC_3H_5O_7$, $Bi(C_7H_5O_2)_3$, $BiPO_4$, $Bi_2(SO_4)_3$, $Pb(OH)_2 \cdot 2PbCO_3$, or $Pb(OH)_2 \cdot PbCO_3$;
to a laser creating a mark;
wherein a lacquer drawdown comprising the additive has a luster index of less than 50%, or wherein the additive has a loading weight of 10 to 60% by weight.

19. A method according to claim 18, wherein the additive has a loading weight of 10 to 40% by weight.

20. A method according to claim 18, wherein the additive comprises BiOCl.

* * * * *